US006955240B2

(12) United States Patent
Ahn et al.

(10) Patent No.: US 6,955,240 B2
(45) Date of Patent: Oct. 18, 2005

(54) DUAL STAGE PASSENGER AIR BAG MODULE

(75) Inventors: Jung-Bae Ahn, Kyunggi-do (KR); Jin-Chul Hwang, Kyunggi-do (KR); Seo-Hong Kim, Kyunggi-do (KR); Ju-Hyung Seo, Kyunggi-do (KR); Tae-Ho Song, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 63 days.

(21) Appl. No.: 10/326,067

(22) Filed: Dec. 23, 2002

(65) Prior Publication Data

US 2004/0012176 A1    Jan. 22, 2004

(30) Foreign Application Priority Data

Jul. 16, 2002  (KR) ...................... 10-2002-0041693

(51) Int. Cl.[7] .............................................. B60R 21/26
(52) U.S. Cl. ..................................... 180/736; 280/741
(58) Field of Search ................................ 280/731, 732, 280/736, 741, 742

(56) References Cited

U.S. PATENT DOCUMENTS

| 3,532,358 | A | * | 10/1970 | Leising et al. ............... 280/741 |
| 3,773,352 | A | * | 11/1973 | Radke ......................... 280/731 |
| 4,810,005 | A | * | 3/1989 | Fohl ............................ 280/732 |
| 5,261,693 | A | * | 11/1993 | Krickl et al. ................ 280/732 |
| 5,286,054 | A | * | 2/1994 | Cuevas ........................ 280/738 |
| 5,658,010 | A | * | 8/1997 | Steffens et al. ............. 280/731 |
| 5,992,875 | A | * | 11/1999 | Cundill .................... 280/728.2 |
| 6,142,519 | A | * | 11/2000 | Smith ......................... 280/741 |
| 6,168,200 | B1 | * | 1/2001 | Greist et al. ................ 280/736 |
| 6,213,496 | B1 | * | 4/2001 | Minami et al. ............. 280/729 |

* cited by examiner

*Primary Examiner*—Paul N. Dickson
*Assistant Examiner*—Laura B. Rosenberg
(74) *Attorney, Agent, or Firm*—Greenblum & Bernstein, P.L.C.

(57) ABSTRACT

A dual-stage air bag module for a passenger seat capable of easily controlling and changing gas pressures to be provided into an air cushion, and also implementing a miniaturization and a lightweight of the air bag module. The first and second inflators, which are controlled by a control unit, are arranged in a diagonal direction to each other within a housing. The first and second inflators are generally inflators for a driver seat air bag modules mounted in a steering wheel. The retainer is fixed in the state that a portion thereof is received in the upper portion of the housing in order to fix the cushion holder assembled with the air cushion within the housing. The retainer is coupled through a predetermined coupling member to the housing with the first and second inflators. Therefore, in accordance with the present invention, it is possible to properly change capacities of the first and second inflators and use various specifications of the first and second inflators, thereby facilitating control of gas pressures provided into the air cushion by the inflators and decreasing an air bag module in its size and weight, by adopting the inflator for a driver seat air bag having a relatively small capability as an inflator for a passenger seat air bag.

5 Claims, 4 Drawing Sheets

[FIG. 1a]
*Conventional Art*
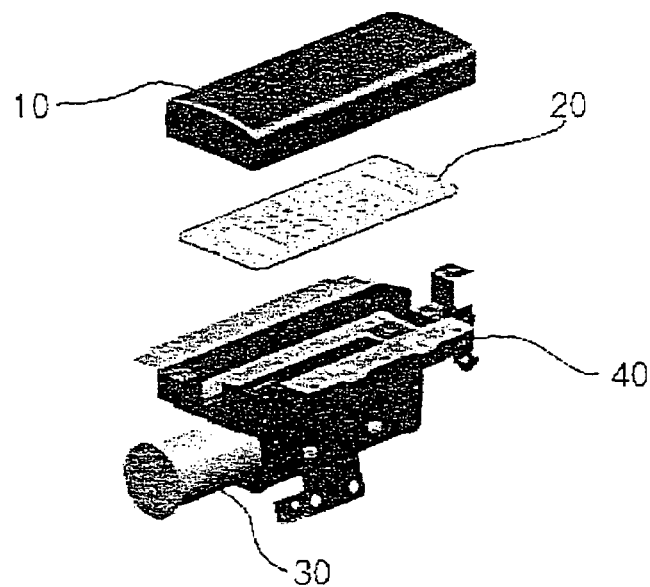
[FIG. 1b]
*Conventional Art*
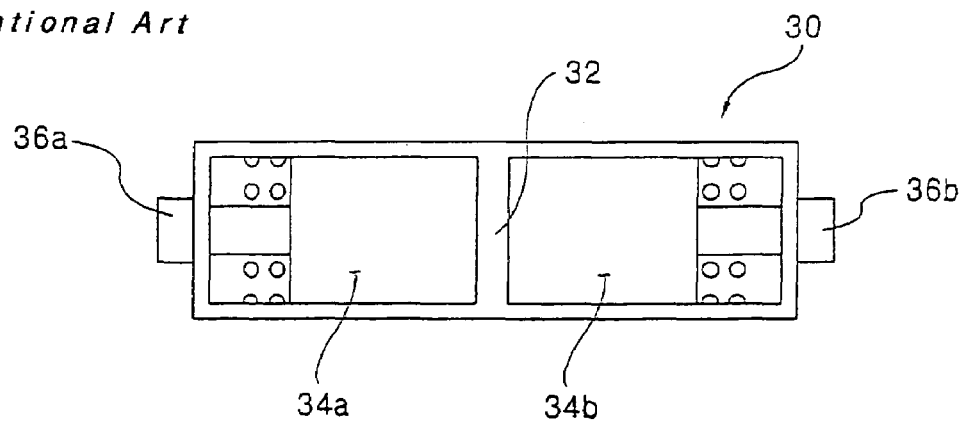

[FIG. 2]
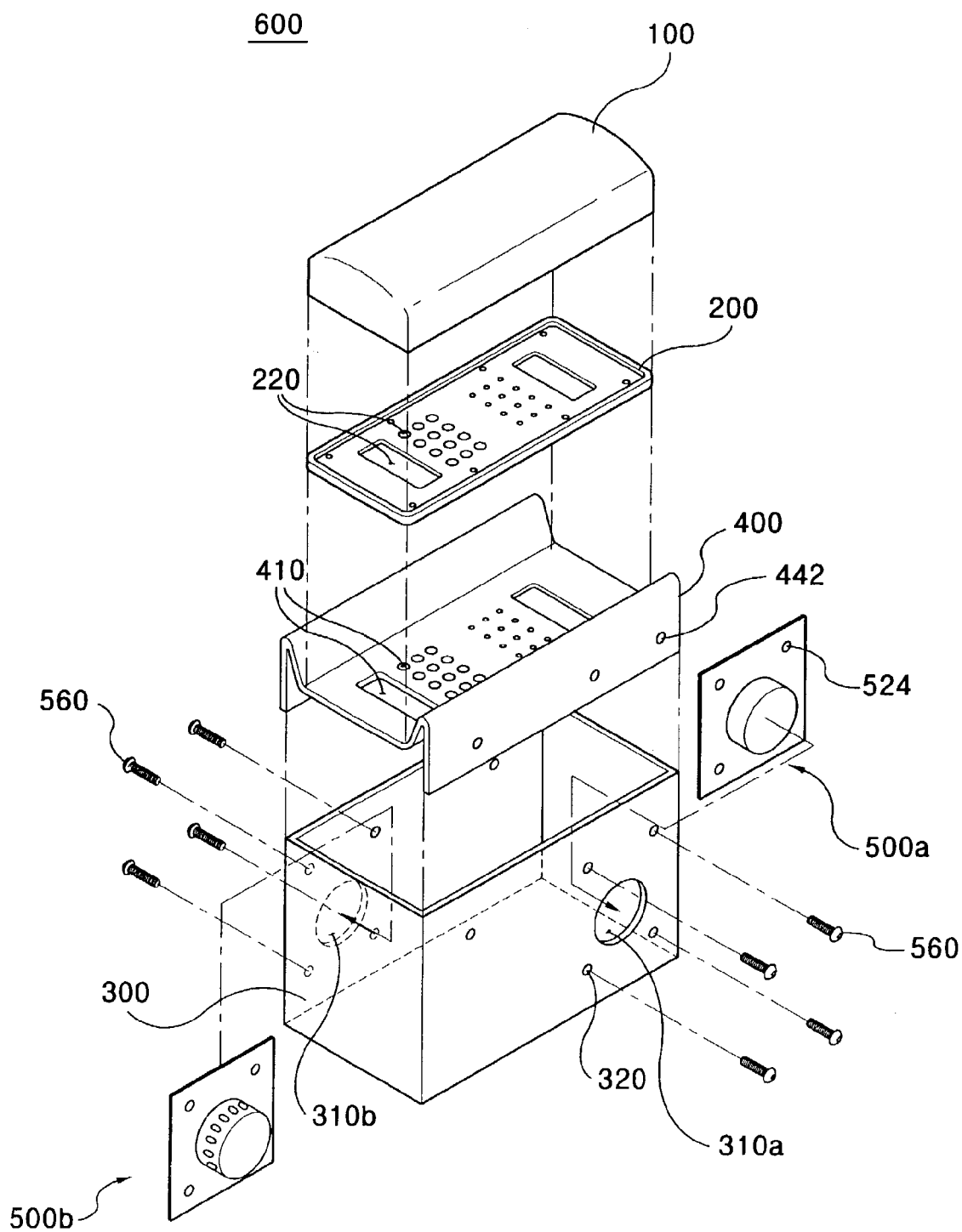

[FIG. 3]
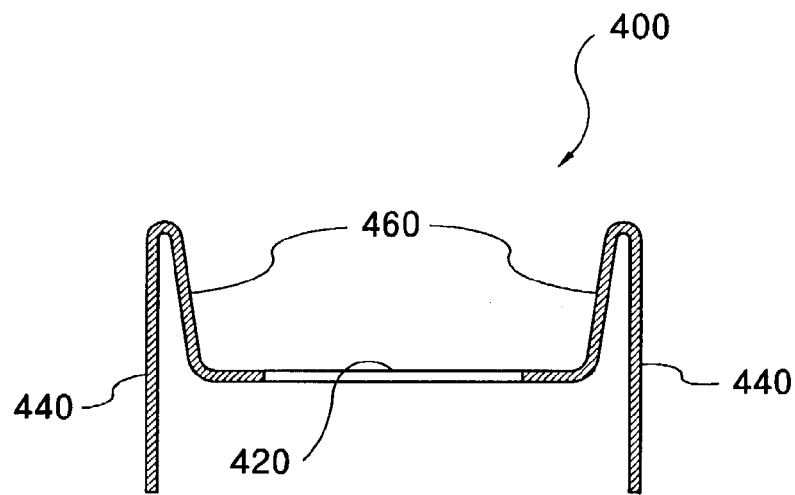
[FIG. 4]
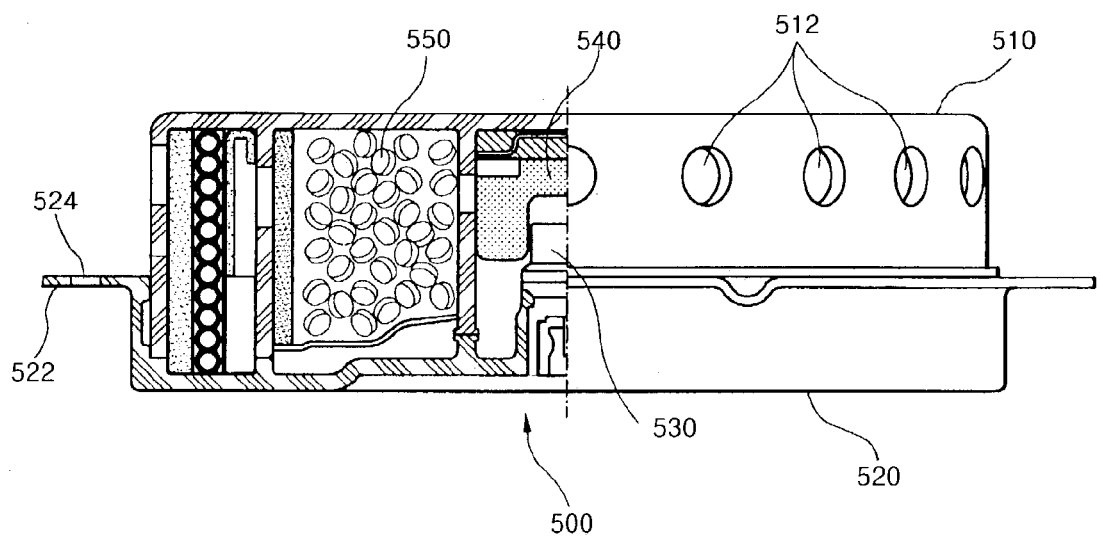

[FIG. 5]
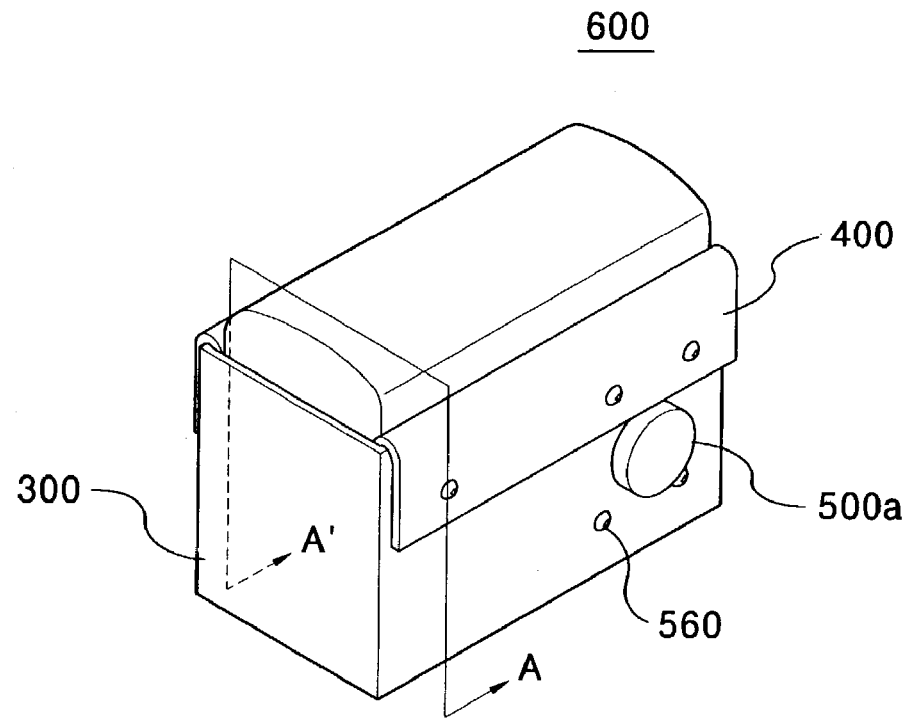
[FIG. 6]
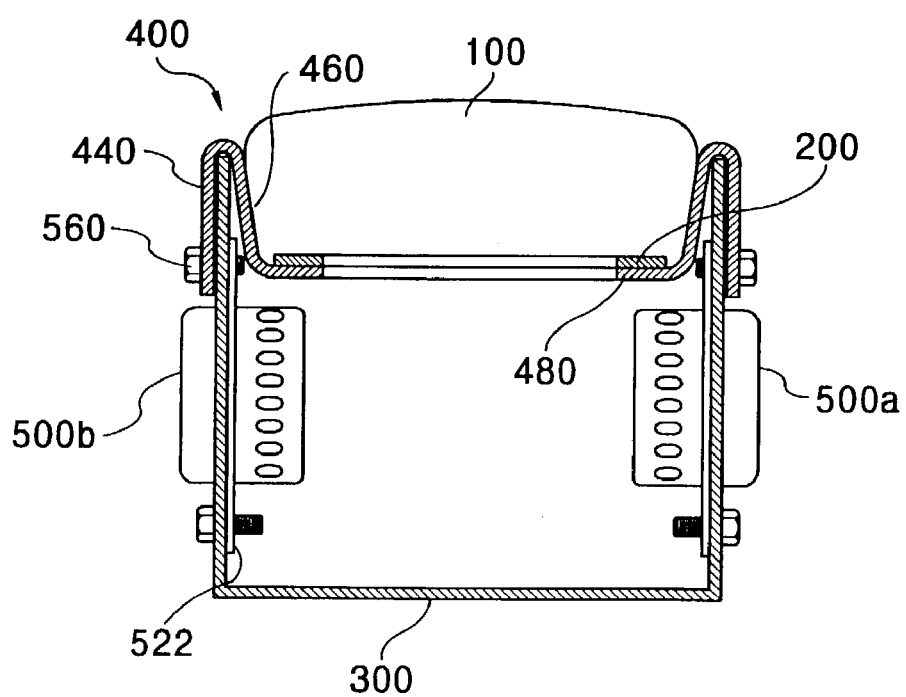

DUAL STAGE PASSENGER AIR BAG MODULE

BACKGROUND OF THE INVENTION

1. Field of the Invention

The present invention relates to an air bag module for a passenger seat of an automobile, and more particularly to a dual-stage seat air bag module for a passenger seat capable of easily controlling and changing gas pressures to be provided into an air cushion, thereby implementing a miniaturization and a lightweight of the air bag module.

2. Description of the Related Art

In general, an automobile includes various types of passenger protecting apparatuses, for example, such as a seat belt and an air bag system.

As among these passenger-protecting apparatuses, particularly, the air bag system is used with the seat belt, and thereby it is prevented that when an automobile collision occurs, body members such as a head, a breast, knees, etc., of a passenger are hit and injured by constructions inside the automobile.

Such an air bag system is mostly mounted in a front seat of the automobile, and is generally distributed into a driver air-bag installed in a steering wheel and a passenger air-bag installed in a crash pad on or on the upper surface of a passenger glove box.

Because the air bag system should be operated momentarily and promptly when an accident such as the automobile collision occurs, various types of inflators are installed in the air bag system for the prompt expansion and spread of the air bag.

As representative inflators, there are an explosion-type inflator for inflating an air bag momentarily by generating gas by combustion or explosion of gas forming agent based on expansive materials, a gas charging type inflator for jetting compressed gas stored in a pressure vessel and inflating an air bag when an automobile collision occurs, and an hybrid type inflator combining advantages of the above-mentioned types of inflators.

FIG. 1a is an exploded perspective view showing a dual-stage air bag module which is generally installed in a front passenger seat of an automobile, and FIG. 1b is a cross-sectional view schematically showing a construction of an inflator shown in FIG. 1a.

As shown in FIG. 1a, a conventional dual-stage air bag module for a passenger seat includes an air cushion 10, a cushion holder 20 for holding the air cushion 10, an inflator 30 for generating gas and providing it to the air cushion 10, and a housing 40 for receiving the inflator 30.

The air cushion 10 is received within the housing 40 with a folded state to have a required form. That is, to the inner lower portion of the air cushion 10 is coupled the cushion holder 20. This cushion holder 20 is again fixed to the housing 40.

The inflator 30 for providing gas to inflate the air cushion 10 is included in the housing 40.

The inflator 30 performs a gas feeding to the air cushion 10 in two steps. As shown in FIG. 1b, the inflator 30 consists of a first combustion chamber 34a and a second combustion chamber 34b separated from one another by an inner diaphragm 32.

In the first and second combustion chambers 34a and 34b are included a first igniter 36a and a second igniter 36b which are connected to gas forming agent (not shown) respectively.

Thus, responding to an electrical signal from a collision sensor (not shown), the first igniter 36a is ignited to burn gas forming agent, and thereby primary compressed gas is generated to fill the air cushion 10.

Then, after a predetermined time interval, the second igniter 36b is ignited to burn gas forming agent included therein, and secondary compressed gas is generated to secondarily fill the air cushion, thereby making a complete expansion of the air cushion 10.

However, because the conventional dual-stage air bag module for a passenger seat should make the two steps of gas output pressures using one inflator 30 and it is also designed to discharge only a desired gas output pressure respectively, there was a problem that control and change of the gas output pressure for obtaining a desired expansivity of the air cushion can not be performed easily.

In addition, there was a problem that size and weight of an air bag module are increased inevitably due to size and weight of the dual stage inflator.

SUMMARY OF THE INVENTION

To achieve the above noted object, a dual stage air bag module for a passenger seat of the present invention includes an air cushion, a housing that receives the air cushion, a first inflator mounted in one lateral-wall surface within the housing, a second inflator mounted in another lateral-wall surface of the housing, the second inflator arranged in a diagonal direction with the first inflator, a cushion holder mounted in the air cushion that fixes the air cushion to the housing, a retainer coupled with the housing, that holds the air cushion on the first and second inflator, and a control unit electrically-connected with the first and second inflator, that sequentially controls operations of the first and second inflator.

Each of the first and second inflator configured for a driver seat air bag module installed in a steering wheel, includes an upper case having a plurality of gas discharging holes formed in an outer surface thereof, and a lower case coupled to a lower portion of the upper case, and each of the first and second inflator comprises a gunpowder that explodes by an external ignition signal in an inner space thereof, an igniter that ignites responding to the explosion of the gunpowder and gas forming agent which is burned by a heat generated from combustion of the igniter therein.

The first and second inflator can be designed to have different capacities to each other for generating different gas pressures upon operations of the inflator by the control unit.

The retainer can include a bottom plate on which the cushion holder is fixed, vertical plates corresponding to the both lateral-wall surfaces of the housing, and connecting plates that connects the bottom plate and the vertical plates, wherein, in case that each of the upper portions of the both lateral-wall parts of the housing is inserted between the vertical plate and the connecting plate, a portion of the first and second inflator, the both lateral-wall surfaces of the housing, and the vertical plates are coupled simultaneously through a coupling member.

To solve the above-indicated problems, it is, therefore, an object of the present invention to provide a dual stage air bag module for an passenger seat, capable of implementing a miniaturization and a lightweight of the air bag module as well as facilitating control and change of a gas output pressure by an inflator, by adopting an inflator for a driver seat having relatively smaller size and volume than a conventional dual stage inflator.

BRIEF DESCRIPTION OF THE DRAWINGS

To achieve the above noted object, a dual stage air bag module for a passenger seat of the present invention includes an air cushion, a housing that receives the air cushion, a first inflator mounted in one lateral-wall surface within the housing, a second inflator mounted in another lateral-wall surface of the housing, the second inflator arranged in a diagonal direction with the first inflator, a cushion holder mounted in the air cushion that fixes the air cushion to the housing, a retainer coupled with the housing, that holds the air cushion on the first and second inflator, and a control unit electrically-connected with the first and second inflator, that sequentially controls operations of the first and second inflator.

Each of the first and second inflator configured for a driver seat air bag module installed in a steering wheel, includes an upper case having a plurality of gas discharging holes formed in an outer surface thereof, and a lower case coupled to a lower portion of the upper case, and each of the first and second inflator comprises a gunpowder that explodes by an external ignition signal in an inner space thereof, an igniter that ignites responding to the explosion of the gunpowder and gas forming agent which is burned by a heat generated from combustion of the igniter therein.

The first and second inflator can be designed to have different capacities to each other for generating different gas pressures upon operations of the inflator by the control unit.

The retainer can include a bottom plate on which the cushion holder is fixed, vertical plates corresponding to the both lateral-wall surfaces of the housing, and connecting plates that connects the bottom plate and the vertical plates, wherein, in case that each of the upper portions of the both lateral-wall parts of the housing is inserted between the vertical plate and the connecting plate, a portion of the first and second inflator, the both lateral-wall surfaces of the housing, and the vertical plates are coupled simultaneously through a coupling member.

The above objects, features and advantages of the present invention will become more apparent from the following detailed description when taken in conjunction with the accompanying drawings, in which:

FIG. 1a is an exploded perspective view showing a conventional dual stage air bag module for a passenger seat;

FIG. 1b is a cross-sectional view schematically showing a construction of an inflator shown in FIG. 1a;

FIG. 2 is an exploded perspective view showing a dual stage air bag module for a passenger seat in accordance with an embodiment of the present invention;

FIG. 3 is an enlarged cross-sectional view showing a construction of a retainer shown in FIG. 2;

FIG. 4 is a view showing an inflator of the present invention;

FIG. 5 is a perspective view showing a coupled state of the air bag module shown in FIG. 2; and FIG. 6 is a cross-sectional view showing a cross-sectional construction taken along A–A' line of FIG. 5.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

In accordance with the present invention, the above and other objects can be accomplished by the provision of a dual stage air bag module for a passenger seat, comprising an air cushion; a housing for receiving the air cushion; a first inflator which is mounted in one lateral-wall surface of the housing; a second inflator which is mounted in another lateral-wall surface of the housing, the second inflator arranged in a diagonal direction with the first inflator; a cushion holder mounted in the air cushion for fixing the air cushion to the housing; a retainer coupled with the housing, for holding the air cushion on the first and second inflators; and a control unit electrically-connected with the first and second inflators, for sequentially controlling operations of the first and second inflators, wherein each of the first and second inflators being inflators for a driver seat air bag module installed in a steering wheel, consists of an upper case having a plurality of gas discharging holes formed in an outer surface thereof and a lower case coupled to a lower portion of the upper case, and the each of the first and second inflators includes a gunpowder for exploding by an external ignition signal, an igniter for igniting responding to the explosion of the gunpowder and gas forming agent which is burned by a heat generated from the ignition of the igniter therein.

Also, the first and second inflators are designed to have different capacities to each other, for generating different gas pressures upon their operation by the control unit.

The retainer consists of a bottom plate on which the cushion holder is fixed, vertical plates corresponding to the both lateral-wall surfaces of the housing and connecting plates for connecting the bottom plate and the vertical plates.

In the state that each of the upper ends of the both lateral-wall surfaces of the housing is inserted between the vertical plate and the connecting plate, a portion of the first and second inflators, the both lateral-wall surfaces of the housing and the vertical plates are coupled simultaneously through a coupling member, According the above construction, a stepped expansion of the air cushion is achieved by coupling the first and second inflators consisting of inflators for a driver seat air bag within the housing and sequentially performing the operations of the first and second inflators through the control unit.

Further, it is also possible to achieve a miniaturization and a lightweight of the air bag module by mounting the relatively small first and second inflators consisting of inflators for a driver seat air bag as the inflators for a passenger seat air bag.

In addition, it is possible to variously change specifications of the first and second inflators and couple them within the housing, and it makes easier to control and change the gas output pressures discharged into the air cushion by the first and second inflators.

Now, a preferred embodiment of the present invention will be described in detail with reference to the annexed drawings.

FIG. 2 is an exploded perspective view showing a whole construction of a dual stage air bag module for a passenger seat in accordance with the present invention. Also, FIG. 3 is an enlarged cross-sectional view detailedly showing a cross-sectional construction of the retainer shown in FIG. 2, and FIG. 4 is a view showing in detail a construction of the inflator shown in FIG. 2.

Referring to FIGS. 2 to 4, the dual stage air bag module 600 in accordance with the present invention comprises an air cushion 100, a cushion holder 200 coupled with the air cushion 100, a housing 300 for receiving the air cushion 100, a retainer 400 for fixing the cushion holder 200 to the housing 300, and first and second inflators 500a and 500b mounted in the housing 300.

Specifically, the cushion holder 200 for holding the air cushion 100 is installed in the inner lower portion of the air cushion 100, and the cushion holder 200 coupled with the air cushion 100 is fixed to the upper surface of the retainer 400.

In the cushion holder 200 are formed a plurality of vent holes 220 to directly flow compressed gas generated from the first and second inflator 500a and 500b into the air cushion 100.

The retainer 400 is fixed in the state that a portion thereof is received in the upper portion of the housing 300 in order to fix the cushion holder 200 assembled with the air cushion within the housing 300.

Also, in the retainer 400 are formed a plurality of vent holes 410 for leading to flow compressed gas generated from the first and second inflator 500a and 500b toward the air cushion 100 as in the cushion holder 200.

As shown in FIG. 3, the retainer 400 consists of a bottom plate 420, vertical plates 440 and connecting plates 460 for connecting the bottom plate and the vertical plates.

On the upper surface of the bottom plate 420 is rested and fixed the cushion holder 200 assembled with the air cushion 100. The vertical plates 440 are arranged in a contact state with both lateral-wall surfaces of the housing 300, while being parallel to the both lateral-wall surfaces.

Also, in the both lateral-wall surfaces of the vertical plates 440 are formed a plurality of coupling holes 442 for coupling the retainer 400 with the housing 300 through coupling members such as bolts.

Some among the coupling holes 442 are used for coupling the first and second inflators 500a and 500b as well as for coupling the vertical plates 440 and the housing 300.

The housing 300 has a rectangle box shape and the upper surfaces of the air cushion 100 and cushion holder 200 are opened for receiving the fixed retainer 400.

Also, in the both lateral-wall surfaces of the housing 300, a pair of openings 310a and 310b for coupling the first and second inflators 500a and 500b are arranged in a diagonal direction to each other, and a plurality of coupling holes 320 for fixing the first and second inflators 500a and 500b, corresponding to the coupling holes 442 of the retainer 400, are formed.

Under these conditions, the coupling holes 320 formed in the housing 300 are used partially for coupling the first and second inflators 500a and 500b as well as for coupling with the retainer 400.

The first and second inflators 500a and 500b are fixed on the inner surfaces of the both lateral-wall parts of the housing 300 in the state that portions of the inflators are protruded outwardly through the openings 310a and 310b in the housing 300.

The first and second inflators 500a and 500b are connected to the control unit (not shown) respectively. The control unit is generally included in an automobile, and electrically connected to the first and second inflators 500a and 500b for sequentially controlling the first and second inflators 500a and 500b.

According to this construction, because stepped gas output pressures are discharged into the air cushion 100 as in a conventional dual stage inflator having two combustion chambers isolated from one another, it is possible to properly control a ratio of expansion to time of the air cushion 100.

That is, by differing a specification of the first inflator 500a from that of the second inflator 500b, for example, by generating a low gas output pressure through the first inflator 500a to expand the air cushion 100 relatively gently, and then after a predetermined time interval, providing a further higher gas output pressure to the air cushion 100 through the second inflator 500b, the air cushion 100 can be expanded rapidly and fully.

Also, because it is possible to properly change capabilities and specifications of the first and second inflators 500a and 500b corresponding to a desired expansion ratio of the air cushion 100 and reconstruct them within the housing 100, the gas output pressures generated by the first and second inflator 500a and 500b can be controlled easily.

The first and second inflators 500a and 500b are generally compact inflators included within an air bag module for a driver seat mounted in the steering wheel.

Through the first and second inflators 500a and 500b having smaller size and weight, it is possible to achieve both the miniaturization of the air bag module due to the size reduction of the housing and the lightweight of the air bag module due to the weight reduction of the inflators, as well as the generation of the stepped gas output pressures. The construction of the inflator adopted in the present invention is shown in detail in FIG. 4, wherein the appearance of the inflator has a flat cylindrical shape as shown in FIG. 4, and the inflator consists of an upper case 510 and a lower case 520 coupled to the lower portion of the upper case.

In the inner side of the inflator surrounded with the upper case 510 and the lower case 520 are included a gunpowder (SQUIB: 530), an igniter 540 for igniting by the explosion of the gunpowder 530, and gas forming agent 550 which is burned by a heat generated by combustion of the igniter 540.

Also, in the outer periphery of the upper case 510 are formed a plurality of gas discharge holes 512 spaced by predetermined intervals from one another so that compressed gas generated by burning gas forming agent can be discharged outwardly.

Then, at the top end of the lower case 520 is formed flanges 522 which are protruded in a radial direction. These flanges 522 have coupling holes 524 for coupling with the first and second inflators 500a and 500b. The coupling holes 524 correspond to the coupling holes 320 formed in the peripheral region of the openings 310a and 310b of the housing 300.

Thus, the first and second inflators 500a and 500b are coupled through bolts 560 to the housing 300 at the outer portion thereof in such a state that the respective flanges 522 are tightly contacted to the peripheral region of the openings 310a and 310b.

FIG. 5 is a perspective view showing a completely assembled construction of the air bag module shown in FIG. 2, and FIG. 6 is a cross-sectional view showing a cross-sectional construction taken along A–A' line shown in FIG. 5.

As shown in FIG. 5 and FIG. 6, the retainer 400 is coupled with the first and second inflators 500a and 500b in the upper portion of the housing 300.

That is, the retainer 400 is coupled with the respective upper portions of the first and second inflators 500a and 500b at one time in such a state that each of the both lateral-wall sides of housing 300 is inserted between the vertical plate 440 and the connecting plate 460 (which are both lateral parts of the retainer), while being contacted with the vertical plate 440 and connecting plate 460.

As described above, the first and second inflators 500a and 500b are coupled through one coupling means with the retainer 400 and the housing 300 at one time, thereby allowing it to efficiently use the area of the housing 300 and thus decrease the air bag module in its size and weight.

Now, the operation of the present invention having the above-described construction is described as follows.

Firstly, when an automobile collision occurs, a collision sensor (not shown) senses the collision and a control unit (not shown) transmits an ignition signal to the first inflator 500a. Then, the gunpowder 530 included within the first inflator 500 generates a small explosion to burn the igniter 540. A heat generated by the ignition burns gas forming agent 550 to generate primary compressed gas.

This primary compressed gas is discharged through the gas discharge holes 512 of the first inflator 500a into the housing 300 and flows via the retainer 400 and the cushion holder 200 positioned on the upper portion of the housing 399 into the air cushion 100, thereby inflating the air cushion 100 at a relatively low and gentle expansion ratio.

Then, after a predetermined time period from an operation beginning time of the first inflator 500a, if an ignition signal is again applied through the control unit to the second inflator 500b, the second inflator 500b generates secondary compressed gas through a same series of processes as in the first inflator 500a. This secondary compressed gas flows into the air cushion 100 to inflate the air cushion 100 rapidly and fully.

As apparent from the above description, a lightweight and a miniaturization of a passenger seat air bag are achieved by mounting an inflator for a driver seat air bag having smaller size and weight than the conventional inflator for a passenger seat air bag, as an inflator for a passenger seat air bag, for performing a same function as the conventional inflator for a passenger seat air bag.

Also, it is possible to variously change the specifications of the first and second inflators within the housing thereby facilitating control and change of the gas output pressure discharged into the air cushion by the first and second inflators.

In addition, because the present invention is constructed to sequentially perform the gas generations from the first and second inflators according to predetermined time intervals, a stepped expansion of the air cushion is possible thereby minimizing a bodily injury to be inflicted on a passenger.

Also, the first and second inflators are coupled with the retainer and housing at one time, thereby maximizing a space use within the housing and accordingly minimizing a whole size of an air bag module as well as increasing a structural rigidity of the coupling region.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A dual stage air bag module for a passenger seat, comprising:
    an air cushion;
    a housing that receives the air cushion;
    a first inflator mounted in one lateral-wall surface within the housing;
    a second inflator mounted in another lateral-wall surface of the housing, the second inflator positioned diagonally with respect to the first inflator;
    a cushion holder mounted in the air cushion that fixes the air cushion to the housing;
    a retainer coupled with the housing, that holds the air cushion on the first and second inflators; and
    a control unit electrically-connected with the first and second inflators, that sequentially controls operations of the first and second inflators,
    wherein each of the first and second inflators are configured for a driver seat air bag module installed in a steering wheel, comprises an upper case having a plurality of gas discharging holes formed in an outer surface thereof, and a lower case coupled to a lower portion of the upper case, and
    each of the first and second inflators comprises gunpowder that explodes by an external ignition signal in an inner space thereof, an igniter that ignites, in response to the explosion of the gunpowder, and a gas forming agent which is burned by heat generated from combustion of the igniter therein.

2. The dual stage air bag module according to claim 1, wherein the first and second inflators are designed to have different capacities than each other for generating different gas pressures upon operation of the inflators by the control unit.

3. The dual stage air bag module according to claim 2, wherein the retainer comprises a bottom plate on which the cushion holder is fixed, vertical plates corresponding to both lateral-wall surfaces of the housing, and connecting plates that connect the bottom plate and the vertical plates,
    wherein, when each of the upper portions of the both lateral-wall parts of the housing is inserted between the vertical plate and the connecting plate, a portion of the first and second inflators, both lateral-wall surfaces of the housing, and the vertical plates are coupled together through a coupling member.

4. The dual stage air bag module according to claim 1, wherein the retainer comprises a bottom plate on which the cushion holder is fixed, vertical plates corresponding to the both lateral-wall surfaces of the housing, and connecting plates that connect the bottom plate and the vertical plates,
    wherein, when each of the upper portions of the both lateral-wall parts of the housing is inserted between the vertical plate and the connecting plate, a portion of the first and second inflators, both lateral-wall surfaces of the housing, and the vertical plates are coupled together through a coupling member.

5. A dual stage air bag module for a passenger seat, comprising:
    an air cushion;
    a housing that receives the air cushion;
    a first inflator mounted in a first inner-surface of the housing;
    a second inflator mounted in a second inner-surface of the housing;
    a cushion holder mounted in the air cushion that fixes the air cushion to the housing;
    a retainer coupled with the housing, that holds the air cushion on the first and second inflators; and
    a control unit electrically-connected with the first and second inflators, that sequentially controls operations of the first and second inflators,
    wherein each of the first and second inflators are configured to be installed in a casing, the second inflator being positioned diagonally with respect to the first inflator, the casing comprising an upper case having a plurality of gas discharging holes formed in an outer surface thereof, and a lower case coupled to a lower portion of the upper case, and each of the first and second inflators comprises gunpowder that explodes by an external ignition signal in an inner space thereof, an igniter that ignites in response to the explosion of the gunpowder and a gas forming agent which is burned by heat generated from combustion of the igniter.

* * * * *